(12) United States Patent
Philbin et al.

(10) Patent No.: US 8,898,139 B1
(45) Date of Patent: Nov. 25, 2014

(54) SYSTEMS AND METHODS FOR DYNAMIC VISUAL SEARCH ENGINE

(75) Inventors: James William Philbin, Santa Monica, CA (US); Anand Pillai, Santa Monica, CA (US); John Flynn, Marina del Ray, CA (US); Hartwig Adam, Marina del Ray, CA (US)

(73) Assignee: Google Inc., Mountain View, CA (US)

( * ) Notice: Subject to any disclaimer, the term of this patent is extended or adjusted under 35 U.S.C. 154(b) by 323 days.

(21) Appl. No.: 13/530,994

(22) Filed: Jun. 22, 2012

Related U.S. Application Data

(60) Provisional application No. 61/501,153, filed on Jun. 24, 2011.

(51) Int. Cl.
*G06F 17/30* (2006.01)

(52) U.S. Cl.
USPC ............ 707/711; 707/715; 707/741; 707/830

(58) Field of Classification Search
None
See application file for complete search history.

(56) References Cited

U.S. PATENT DOCUMENTS

| | | | |
|---|---|---|---|
| 5,915,038 A * | 6/1999 | Abdel-Mottaleb et al. ... | 382/209 |
| 7,624,337 B2 | 11/2009 | Sull et al. | |
| 7,823,055 B2 | 10/2010 | Sull et al. | |
| 8,489,987 B2 * | 7/2013 | Erol et al. .................... | 715/273 |
| 2002/0083031 A1 * | 6/2002 | De Varax ....................... | 707/1 |
| 2008/0027917 A1 | 1/2008 | Mukherjee et al. | |
| 2009/0092340 A1 | 4/2009 | Arguelles | |
| 2010/0036883 A1 * | 2/2010 | Valencia-Campo et al. ....................... | 707/104.1 |
| 2010/0322303 A1 | 12/2010 | Wada et al. | |
| 2012/0109993 A1 * | 5/2012 | Reznik ......................... | 707/765 |
| 2012/0128241 A1 | 5/2012 | Jung | |

FOREIGN PATENT DOCUMENTS

WO 2013/075324 5/2013

* cited by examiner

*Primary Examiner* — Hung Q Pham
(74) *Attorney, Agent, or Firm* — Fish & Richardson P.C.

(57) ABSTRACT

Systems and methods for a dynamic visual search engine are provided. In one example method, a criteria used to partition a set of compressed image descriptors into multiple database shards may be determined. Additionally, a size of a dynamic index may be determined. The dynamic index may represent a dynamic number of images and may be configured to accept insertion of reference images into the dynamic index that can be search against immediately. According to the method, an instruction to merge the uncompressed image descriptors of the dynamic index into the database shards of the compressed image descriptors may be received, and the uncompressed image descriptors of the dynamic index may be responsively merged into the database shards of the compressed image descriptors based on the criteria.

21 Claims, 7 Drawing Sheets

SYSTEMS AND METHODS FOR DYNAMIC VISUAL SEARCH ENGINE

CROSS-REFERENCE TO RELATED APPLICATIONS

This application claims the benefit of U.S. Provisional Application No. 61/501,153 filed Jun. 24, 2011, the entirety of which is herein incorporated by reference.

FIELD

This disclosure relates to object recognition, and in examples, to a visual search engine.

BACKGROUND

The ability to recognize objects can be used in many applications. While humans may easily identify a given object within an image or video, the same task may be complex for computer vision systems. Numerous approaches and techniques have been developed to attempt to recognize objects using computer vision systems.

A visual search engine may match an image to reference images within an index. For example, an index may contain images of a set of objects, with one or more images of visual appearances of the object, as well as metadata identifying the objects. Given an image of an object to be recognized, the visual search engine may retrieve reference images similar to the object and determine a match. Often times corresponding metadata of the matched reference images may also be returned, such as a type, name, title, etc., of the recognized object.

SUMMARY

This disclosure may disclose, inter alia, systems and methods for a dynamic visual search engine.

In one example, a method is provided that includes determining a criteria used to partition a set of compressed image descriptors into multiple database shards. An image descriptor may represent a portion of an image, and a database shard may include compressed image descriptors for a plurality of images. The method may also include, but is not limited to, determining a size of a dynamic index that includes uncompressed image descriptors for a dynamic number of images. The dynamic index may be configured to accept insertion of one or more reference images into the dynamic index. The method may further include receiving an instruction to merge the uncompressed image descriptors of the dynamic index into the database shards of the compressed image descriptors. According to the method, in response to the instruction, the uncompressed image descriptors of the dynamic index may be merged into the database shards of the compressed image descriptors based on the criteria.

In another example, a non-transitory computer-readable memory having stored thereon instructions executable by a computing device to cause the computing device to perform functions is provided. The functions may include determining a criteria used to partition a set of compressed image descriptors into multiple database shards. An image descriptor may represent a portion of an image, and a database shard may include compressed image descriptors for a plurality of images. The functions may also include, but are not limited to, determining a size of a dynamic index that includes uncompressed image descriptors for a dynamic number of images. The dynamic index may be configured to accept insertion of one or more reference images into the dynamic index. The functions may further include receiving an instruction to merge the uncompressed image descriptors of the dynamic index into the database shards of the compressed image descriptors. According to the functions, in response to the instruction, the uncompressed image descriptors of the dynamic index may be merged into the database shards of the compressed image descriptors based on the criteria.

In another example, a system is provided that includes a first search engine, a second search engine, and an index manager. The first search engine may be configured to search database shards of compressed image descriptors. An image descriptor may represent a portion of an image and a database shard may include compressed image descriptors for a plurality of images. The second search engine may be configured to search a dynamic index of uncompressed image descriptors. The dynamic index may include uncompressed image descriptors for a dynamic number of images. Also, the dynamic index may be configured to accept insertion of one or more reference images into the dynamic index. The index manager may be configured to merge the uncompressed image descriptors of the dynamic index into the database shards of the compressed image descriptors and purge the uncompressed image descriptors from the dynamic index. While the merging occurs, the system may allow uninterrupted responding to queries by the first search engine and the second search engine.

The foregoing summary is illustrative only and is not intended to be in any way limiting. In addition to the illustrative aspects, implementations, and features described above, further aspects, implementations, and features will become apparent by reference to the figures and the following detailed description.

The systems and methods described herein may facilitate searching with high speed, using an image, over a very large number of images, for objects contained in the query image, whilst simultaneously accepting new images which can be added to the index and retrieved from almost immediately. For example, a first search index may contain compressed image descriptors partitioned into database shards that be served across many machines. Additionally, a second search index may contain uncompressed image descriptors that can be matched against queries and accept insertion of images which can be queried against immediately. An index manager may be configured to merge the uncompressed image descriptors and compressed image descriptors into new index files that may be swapped for the database shards of the first search index with no discernible delay in matching queries against the search indexes. In some instances, by swapping database shards one-by-one, the number of images that are unable to be matched against during swapping may be minimized. Additional features and advantages will be or become apparent to one with skill in the art upon examination of the following figures and description.

DETAILED DESCRIPTION

Figure 1:
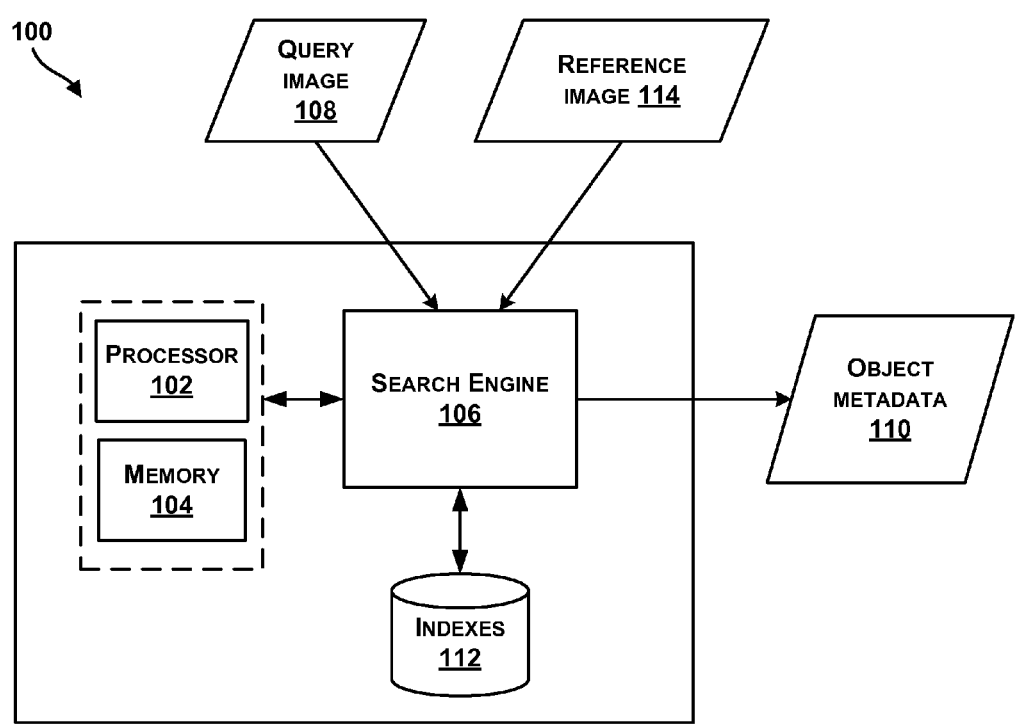
FIG. 1 illustrates an example system.

In the following detailed description, reference is made to the accompanying figures, which form a part hereof. In the figures, similar symbols typically identify similar components, unless context dictates otherwise. The illustrative implementations described in the detailed description, figures, and claims are not meant to be limiting. Other implementations may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure may disclose, inter alia, systems and methods for a dynamic visual search engine. In some instances, the dynamic visual search engine may facilitate searching, using a query image, over a large number of other images represented in one or more indexes, while accepting new images, possibly simultaneously, which can be added to the indexes and matched against query images. For example, the visual search engine may search for objects contained in the query image from among the other images.

An example system may be configured to search for image descriptors matching image descriptors of a query image. For example, the system may search for image descriptors using a first search engine and a second search engine. The first search engine may include compressed image descriptors separated into multiple database shards that can be served across multiple machines and be swapped dynamically. Also, the second search engine may include uncompressed image descriptors that may be stored in a database which can accept insertion of additional image descriptors for new images dynamically. In some instances, due to the database nature of the second search engine, the new images may be able to be queried against immediately. For example, a user can add an image to the database and the image may be accessible immediately via subsequent queries. In addition, in some instances, images can be removed or deleted from the database while allowing the system to match query images against the images of the database without interruption.

The example system may further include an index manager configured to merge uncompressed image descriptors currently in the database of the second search engine into the database shards of compressed image descriptors in response to an instruction. For example, the index manager may join the uncompressed image descriptors of the database with the compressed image descriptors so as to create new versions of the database shards. The new versions of the database shards may represent images previously represented by the database shards in addition to the images previously represented in the database of the second search engine. The index manager may replace the database shards with corresponding database shards from the new versions of database shards. Once the swap is confirmed, the index manager may purge the images that are served in the new database shards from the database of the second search engine. In some instances, the replacement and update of the database shards may occur with no discernible delay in serving image queries or decrease in image recognition performance. For instance, the replacement and update of the database shards may occur without any downtime for the first search engine or the second search engine in terms of serving queries.

Referring now to the figures, FIG. 1 illustrates an example system 100. In some examples, the system 100 may be configured to operate as a dynamic visual search engine. The system 100 may include a processor 102 coupled to a memory 104, as well as a search engine 106 configured to receive a query image 108 and provide object metadata 110 for one or more objects within the query image 108. For instance, the search engine 106 may be configured to search for an object within the query image 108 by accessing one or more indexes 112. Also, the search engine may be configured to receive a reference image 114, and incorporate the reference image 114 into the indexes 112.

The processor 102 may be any type of processor, such as a microprocessor, digital signal processor (DSP), multicore processor, etc., coupled to the memory 104. The memory 104 may be any type of memory, such as volatile memory like random access memory (RAM), dynamic random access memory (DRAM), static random access memory (SRAM), or non-volatile memory like read-only memory (ROM), flash memory, magnetic or optical disks, or compact-disc read-only memory (CD-ROM), among other devices used to store data or programs on a temporary or permanent basis.

The search engine 106 may include one or more sub-components. For example, the search engine 106 may include one or more visual search engines. In one example, a visual search engine may have access to and interact with a set of training images of the indexes 112. Given the query image 108, the visual search engine may retrieve and output training images from the indexes 112 that are similar to the query image 108.

In one example, the visual search engine 106 may determine one or more training images having image descriptors or image templates similar to the query image 108. For each image, descriptors for image interest points, e.g., corners, text, blobs, etc., may be extracted and an image template may be built based on the descriptors. In some examples, a template may include the extracted information of the image and a set of descriptors of all interest points in the image.

In some instances, a descriptor may be or include a vector of numbers and may include information extracted from local pixels around an image interest point. In one example, an image interest point may be a point in the image that can have a clear definition, e.g., may be mathematically well-founded, can have a well-defined position in image space, can have a local image structure that is rich in terms of local information contents, and is stable under local and global perturbations in the image domain.

In some examples, image descriptors may be compressed by transforming the image descriptors to exemplars determined using k-means clustering, or other clustering methods, and compressing the information to reduce size and increase searching speed or efficiency.

According to an example compression method, a data set that includes a plurality of vectors which are image descriptors associated with one or more images may be precisely compressed to improve approximate nearest neighbor search algorithms. Initially, a dominant orientation of the data set may be determined, and the data set may be processed based on the dominant orientation. In some instances, the data set may be rotated to remove covariance among dimensions of the data set. For example, principal components of the data set may be determined, and the data set may be rotated such that the plurality of vectors is expressed in terms of the principal components. In another instance, the data set may be fitted to a multivariate Gaussian distribution to determine the dominant orientation.

The example compression method may also include dividing the processed data set into groups of subvectors in order to evenly distribute variances within given dimensions of the processed data set across the groups of subvectors. For example, data dimensions of the processed data set may be permuted to evenly spread the variance across groups of subvectors that the data dimensions are divided into.

Additionally, one or more exemplars may be chosen to describe or represent each group of subvectors. In some examples, the exemplars may be chosen to minimize a sum of squared distances between dimensions of the subvectors and a nearest exemplar. In one instance, the exemplar may be an average of elements of a dimension of a group of subvectors, for example. The chosen exemplars, as well as information associated with how the data set was projected or rotated, may be stored in an index describing the plurality of vectors.

The search engine 106 may, in some examples, compare image descriptors or templates of images to determine matching images. For example, a number of similar image descriptors between a training image and the query image 108 may be above a threshold. Accordingly, the training image may be determined to be a match to the query image 108. Optionally, object metadata 110 associated with the training image may be returned.

In a further example, for each similar training image, a match score may be provided. For example, the match score may be computed based on a combination of one or more of the number of matched descriptors between the query image 108 and the training image, a computed similarity between raw image data of the query image 108 and the training image, or other potential image comparison algorithms or methods. In some instances, the query image 108 or a portion of the query image 108 may match to a portion of a training image. Other example methods for image matching based on image descriptors are also contemplated.

The query image 108 may be one or more images submitted by one or more users. The query image 108 may be of any size, shape, and/or form. Similarly, the query image 108 may be two-dimensional, e.g., photographs, figures, pictures, or three-dimensional, e.g., a hologram, three-dimensional model, etc. The query image 108 may be captured by stationary or mobile optical devices such as cameras, cellular phones, wearable computing devices, etc., or otherwise input by a system or a user, e.g., a visual sketch drawn or otherwise rendered on an input surface. In one example, the query image 108 may be a static frame captured from a moving image.

In some examples, a user may submit the query image 108 in order to find images matching the query image 108, or to find out information about the query image 108, for example. Images matching the query image 108 may include object metadata 110 associated with and/or describing the matched images that may be output to the user.

The query image 108 may be of one or more of any number of image file formats. For example, the plurality of query images may include one or more image files composed of either pixel or vector data that are rasterized to pixels when displayed in a vector graphic display. Example image file formats include JPEG, JPEG 2000, TIFF, RAW, PNG, GIF, BMP, among other possible image file formats.

In some examples, the query image 108 may be an image provided in order to perform content-based image retrieval. Content from within the query image may be analyzed, and training images matching the content of the query image may be returned. For example, content within the query image 108 may refer to colors, shapes, textures, or other information derived from an image. In some examples, the query image 108 may include an image submitted by a user containing metadata such as keywords, tags, or other descriptions associated with the images.

In one example, the indexes 112 may include one or more training images of individual objects for a set of objects. For each object, there may be one or more training images including visual appearances of the object, as well as object metadata 110, e.g., type, name, etc., associated with the object. In some examples, information within indexes 112 may be processed for use in conjunction with the search engine 106. For instance, image templates of image descriptors of training images in the indexes 112 may be determined and matched against image descriptors of the query image 108 by the search engine 106.

In another example, the indexes 112 may include a static index. In one instance, the static index may be an index which references a static or fixed number of compressed image descriptors. In some examples, the static index may be updated to reference a new version of compressed image descriptors. The image descriptors may be representations of sub-parts of images stored within RAM or on a disk, for example. Additionally, the compressed image descriptors may be sharded into portions that may be served on and stored across one or more machines, and compressed according to a variety of methods. In one example, a set of exemplars in a descriptor space may define the partitioning. For example, descriptors from images of the static index may be assigned to a nearest exemplar using a clustering algorithm, e.g., k-means. Image descriptors near a given exemplar may be partitioned into a particular shard along with other image descriptors whose nearest exemplars are also the given exemplar. Within the particular shard, the image descriptors may be compressed.

In one instance, the static index may be divided into many partitions, e.g., two million, with any number of descriptors per partition, e.g., about twenty thousand descriptors per partition. In some instances, sharding the compressed image descriptors may allow portions of image descriptors to be swapped dynamically while still serving image queries. For example, a first search engine of the search engine 106 may be configured to search multiple shards of the compressed image descriptors for images matching the query image 108. In some examples, a given shard may be replaced with an updated version of the shard, and the first search engine may be configured to temporarily search remaining shards of the multiple shards during the replacement.

In yet another example, the indexes 112 may include a dynamic index including uncompressed image descriptors. The dynamic index may be stored in RAM, optionally across many machines, and provide information for a dynamic number of images, for example up to one million images. The dynamic index may also be capable of accepting the insertion of images, e.g., reference image 114, which may be queried against immediately. For example, the reference image 114 may be a query image 108 submitted by a user with, or without, an accompanying request to add the query image 108 to the indexes 112. In another example, the reference image 114 may be an image retrieved from a web database or other database annotated with object metadata 110 to be included within the indexes 112. Similar to the query image 108, the reference image 114 may be of any number of sizes, file formats, etc. A second search component of the search engine 106 may be configured to search the dynamic index.

In one example, the search engine 106 may also include an index manager configured to join images within the static index and the dynamic index to create new static index files. In some instances, static index files may be smaller and cheaper, i.e., require less computational power, to search compared with dynamic index files. In one instance, combining information of the static index and the dynamic index into a single static index may clear space in the dynamic index to allow the information of the dynamic index to be searched more quickly compared to searching the static index and dynamic index concurrently, and may allow additional reference images to be added to the dynamic index.

Figure 2:
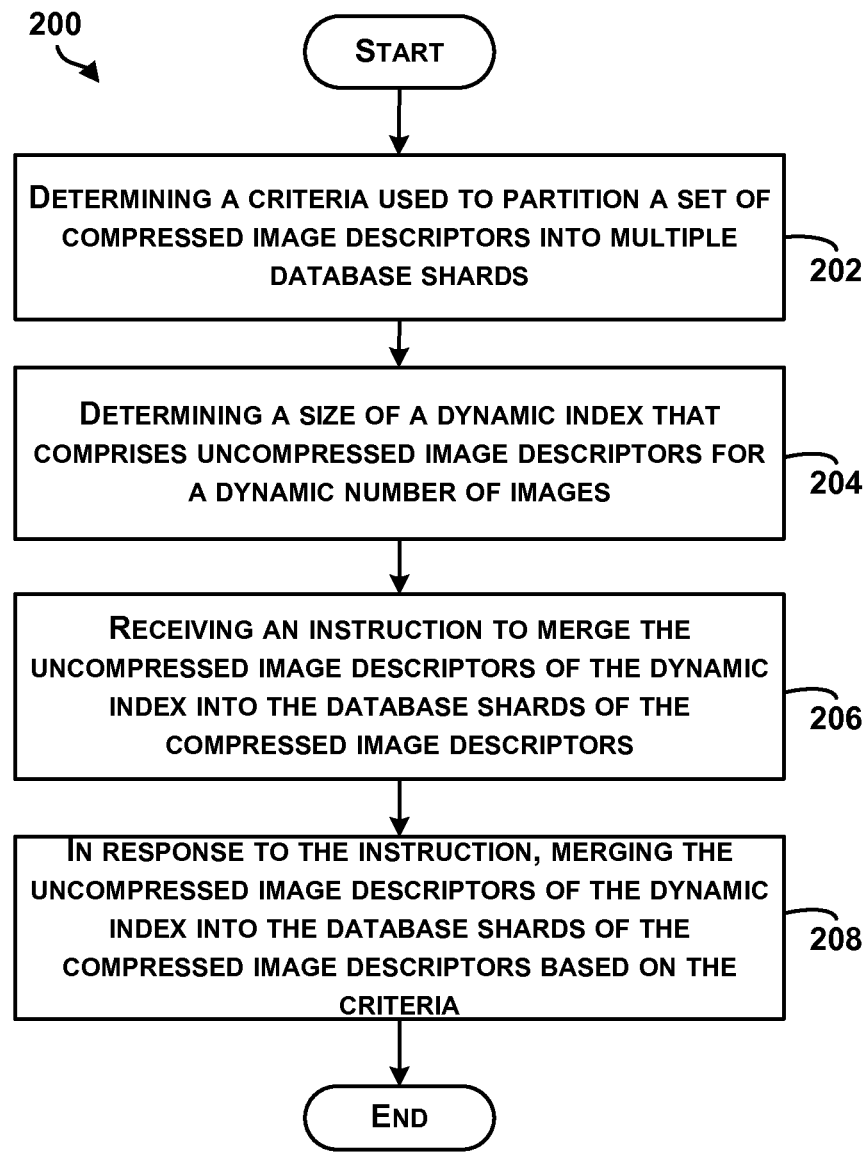
FIG. 2 is a block diagram of an example method of updating a static index to incorporate images represented within a dynamic index, in accordance with at least some implementations described herein.

FIG. 2 is a block diagram of an example method 200 of updating a static index to incorporate images represented within a dynamic index. Method 200 shown in FIG. 2 presents an implementation of a method that could be used with the system 100 of FIG. 1, for example, and/or may be performed by a device or components of a device. Method 200 may include one or more operations, functions, or actions as illustrated by one or more of blocks 202-208. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 200 and other processes and methods disclosed herein, the block diagram shows functionality and operation of one possible operation of present implementations. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 200 and other processes and methods disclosed herein, each block in FIG. 2 may represent circuitry that is wired to perform the specific logical functions in the process.

Initially, at block 202, the method 200 includes determining criteria used to partition a set of compressed image descriptors into multiple database shards. In one example, an image descriptor may represent a portion of an image, and a database shard may include compressed image descriptors for a plurality of images. In some instances, image descriptors for the plurality of images may be determined. The image descriptors may be partitioned into database shards, and compressed at a shard level. In one example, an individual shard may include many, e.g., thousands, of similar image descriptors from interest points of the plurality of images.

In one example, the set of compressed image descriptors may have been partitioned by grouping the image descriptors into similar image descriptors closest to a given exemplar from a set of exemplars, such that a given shard includes image descriptors near a given exemplar for all exemplars of the set of exemplars. Thus, the criteria may include a list of a set of exemplars and associated database shards. In another example, the compressed image descriptors may be arranged or sorted into a sequential order, and the compressed image descriptors may be sequentially divided among the database shards based on the sequential order. In other examples, the compressed image descriptors may be partitioned into the database shards based on any type of value associated with the compressed image descriptors, and the determined criteria may indicate particular ranges of values for given database shards.

Additionally, a search engine may be configured to search a static index of the compressed image descriptors for image descriptors matching image descriptors of a query image. In some instances, an identification component may maintain relationships between image descriptors represented within particular shards and images from which the image descriptors originate.

At block 204, the method 200 includes determining a size of a dynamic index that comprises uncompressed image descriptors. For instance, the size may be a number of images, number of image descriptors, physical memory size, etc. The dynamic index may include uncompressed image descriptors for a dynamic number of images. For example, the dynamic index may be configured to accept new images such that the number of images in the dynamic index changes. In one instance, the uncompressed image descriptors may be stored in an in-memory database. A search engine may be configured to search for uncompressed image descriptors of the database matching to image descriptors of a query image. The dynamic index may also be configured to accept insertion of one or more reference images into the dynamic index which can be searched against immediately. For example, one or more reference images to be added to the dynamic index may be received. Image descriptors associated with the one or more reference images may be determined and added to the dynamic index. Optionally, the one or more reference images may include associated metadata that is stored with the uncompressed image descriptors.

After the image descriptors associated with the one or more reference images have been determined and added to the database, the one or more reference images may be searchable via subsequent searches. In one example, a first user may request that a first image be added to a search index associated with a search engine. Image descriptors associated with the first image may be determined, and added to the dynamic index in real-time or near real-time. A second user may search for an object in the first image at an instance in time after the request. A first search engine of the search engine may search a static index for images matching the object while a second search engine searches the dynamic index. In one example, the first image, submitted by the first user, may be returned as a result of the search by the second user.

In some examples, the one or more reference images may be received while a query image is also being received. For example, multiple users may interact with the search engine simultaneously. In one instance, a user may add one, or multiple reference images, while another user is simultaneously searching using a query image.

At block 206, the method 200 includes receiving an instruction to merge the uncompressed image descriptors of the dynamic index into the database shards. In one example, an index manager may monitor a size of the dynamic index. For example, the index manager may be a computer component associated with the dynamic index. In one instance, when the size is greater than a predetermined threshold, e.g., a number of images or a number of image descriptors, the index manager may provide the instruction to merge the images into the multiple shards of the compressed image descriptors. In other instances, the instruction may be issued periodically, e.g., once per day, once every 8 hours, etc. In still other instances, the instruction may be issued by a user or system manager who has recently added a large batch of images to the dynamic index.

At block 208, the method 200 includes, in response to the instruction, merging the uncompressed image descriptors of the dynamic index into the database shards of the compressed image descriptors based on the criteria. In one instance, uncompressed image descriptors corresponding to the compressed image descriptors represented in the database shards may be determined. For example, the uncompressed image descriptors may be retrieved from a separate database based on an index identifying stored locations of corresponding uncompressed image descriptors. In another example, the corresponding uncompressed image descriptors may be determined by uncompressing the compressed image descriptors. The uncompressed image descriptors associated with the compressed image descriptors may be combined with the uncompressed image descriptors of the dynamic index so as to create a plurality of uncompressed image descriptors.

In one example, the plurality of uncompressed image descriptors may be compressed into a second version of the database shards of compressed image descriptors. For example, the plurality of uncompressed image descriptors may be clustered into similar partitions of image descriptors using similar or the same exemplars as used previously to partition the compressed image descriptors of the first search engine.

In one instance, image descriptors from the plurality of images of the first search engine may have been partitioned by grouping the image descriptors into similar image descriptors closest to a given exemplar from a first set of exemplars, and the similar image descriptors may be compressed such that a given shard includes image descriptors near a given exemplar for all exemplars of the first set of exemplars. The plurality of uncompressed image descriptors may also be partitioned using the same compression method such that a second version of the given shard, including the same group of image descriptors of the plurality of images, and any additional image descriptors from the dynamic index results for all the shards. Thus, a second version of database shards, approximately mapping to the database shards of the first search engine and also including image descriptors representing the images of the dynamic index, may be determined.

In some examples, a given image descriptor may consistently map to the same database shard from version to version. For instance, in some examples, the image descriptors may be compressed using a consistent method based on a known vocabulary. In other examples, a given image descriptor may map to a different database shard as a version of the database shards is updated. For instance, image descriptors may be compressed using a dynamic vocabulary that is based at least in part on content of the image descriptors or an amount of image descriptors being compressed.

In some examples, the database shards of the first search engine may be swapped out for or replaced with the second version of database shards. For instance, individual shards of the database shards of the first search engine may be replaced with corresponding individual shards of the second version of the database shards one-by-one. In other examples, multiple database shards, or all of the database shards, may be swapped out at a time. In one instance, the database shards may be replaced while a query image is received, and there may be no discernible delay in determining the images associated with the query image. For instance, because continuity is maintained between particular database shards from version to version and the number of database shards does not change in some examples, the first search engine may continue to operate as normal, searching a constant number or smaller number of database shards.

Similarly, because the image descriptors are partitioned into multiple database shards approximately mapping to particular database shards from version to version, potentially lost matches due to searching while an individual database shard is being replaced can be minimized. That is to say, during a replacement of a given database shard, query images with image descriptors which happen to be most similar to a given exemplar used to determine the given database shard may be potentially lost or not returned while the given database shard is being replaced, but query images with image descriptors not similar to the given exemplar are not affected by the replacement. Moreover, as the number of exemplars and database shards increases, the probability of lost matches during a replacement of a database shard decreases. It is contemplated that as many as two million partitions may be used to represent a static index including on the order of one hundred million images. Thus, any decrease in image recognition performance due to merging may be minimal.

In some examples, the uncompressed image descriptors may be purged from the dynamic index. For example, after the uncompressed image descriptors have been incorporated into the plurality of image descriptors in the static index, the dynamic index may be cleared of the uncompressed image descriptors. In one instance, the database shards may be replaced while one or more reference images are added to the dynamic index. For example, new reference images may be added to the dynamic index before, during, or after the merging. After the database shards of the first search engine have been updated to the new version, the uncompressed image descriptors that have been copied over and merged into the database shards may be deleted such that the new reference images are left in the dynamic index. In some examples, the purging of the dynamic index may be performed in response to completion of the merging. Thus, the dynamic index may continue to serve queries concurrently with additions and deletions to the dynamic index.

Figure 3:
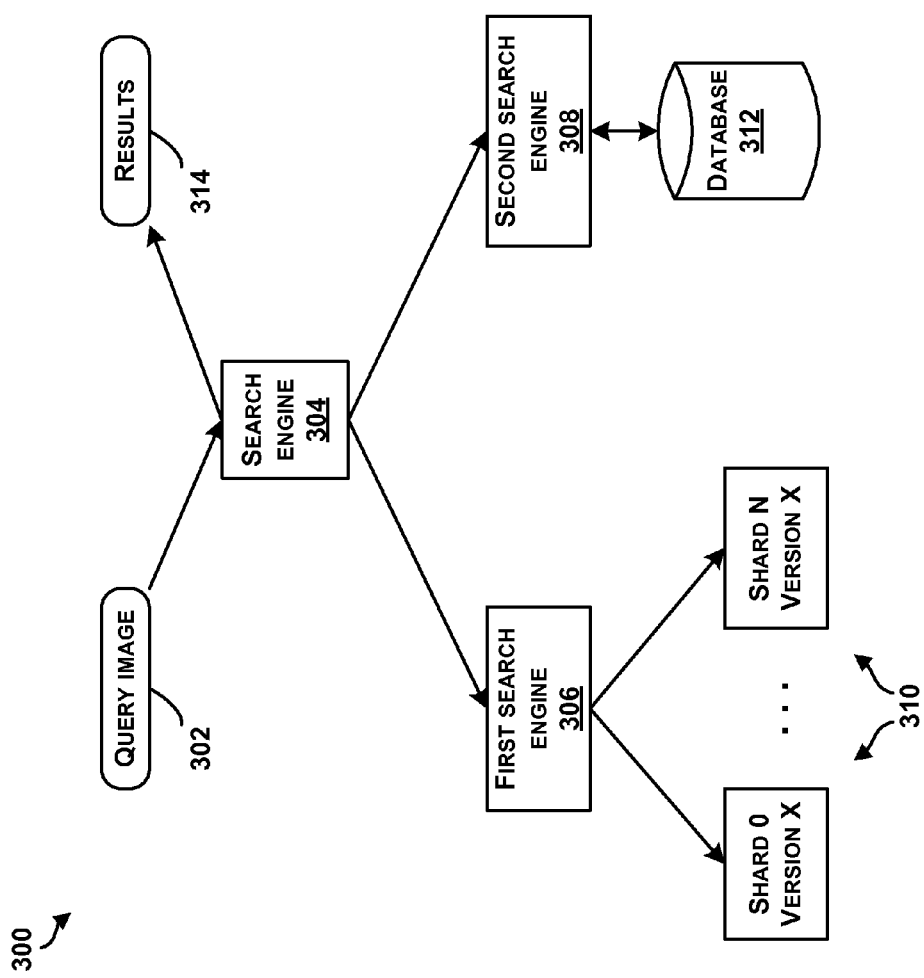
FIG. 3 is a flow diagram illustrating an example configuration of a system.

FIG. 3 is a flow diagram illustrating an example configuration of a system 300. As shown in FIG. 3, a query image 302 may be received by a search engine 304. For example, the query image 302 may be received at a root node of the search engine 304. The query image 302 may be submitted, for example, as a request for information associated with one or more objects in the query image 302.

The search engine 304 may include a first search engine 306 and a second search engine 308 configured to search for images matching the query image 302, or a portion of the query image 302. In one instance, the first search engine 306 may include a searchable static index of compressed image descriptors partitioned into database shards 310. For example, the first search engine 306 may be used to search for image descriptors similar to or matching image descriptors of the query image 302. The second search engine 308 may include a searchable database 312 of uncompressed image descriptors. In one example, the database 312 may include images recently added to the database 312 and/or images added to the database 312 while the searching transpires.

The search engine 304 may return results 314 of the search. In one example, the results 314 may include one or more images of objects and any metadata associated with the images. The search engine 304 may match a region or multiple regions of the query image 302 to one or more images represented within the database shards 310 and/or the database 312. The search engine 304 may also output a matched region and/or matched image descriptors associated with a matching image.

In one example, the search engine 304 may associate match scores with matches between the query image 302 and one or more images. For instance, the match score may indicate a level of similarity between the query image 302 and a matching image. In some examples, matches may be prioritized or ranked based on match scores. In one example, the level of similarity may be determined based on a number of matched image descriptors between the query image 302 and an image and/or a nearness between an image descriptor of the query image and an image descriptor of the image. However, other methods of determining similarity are also contemplated. In one example, an image distance measure may compare the similarity of two images in various dimensions such as color, texture, shape, and others. In other examples, geometries, e.g., shapes, sizes, etc., associated with image descriptors may be determined, and used to rank matches and/or determine match scores. In still another example, random sample consensus, "RANSAC", may be used to ensure geometric consistency across multiple image descriptor matches. For instance, RANSAC may be used to estimate similarities between image descriptors from two images, taking into account potential outliers due to erroneous measurements or noise.

Figure 4:
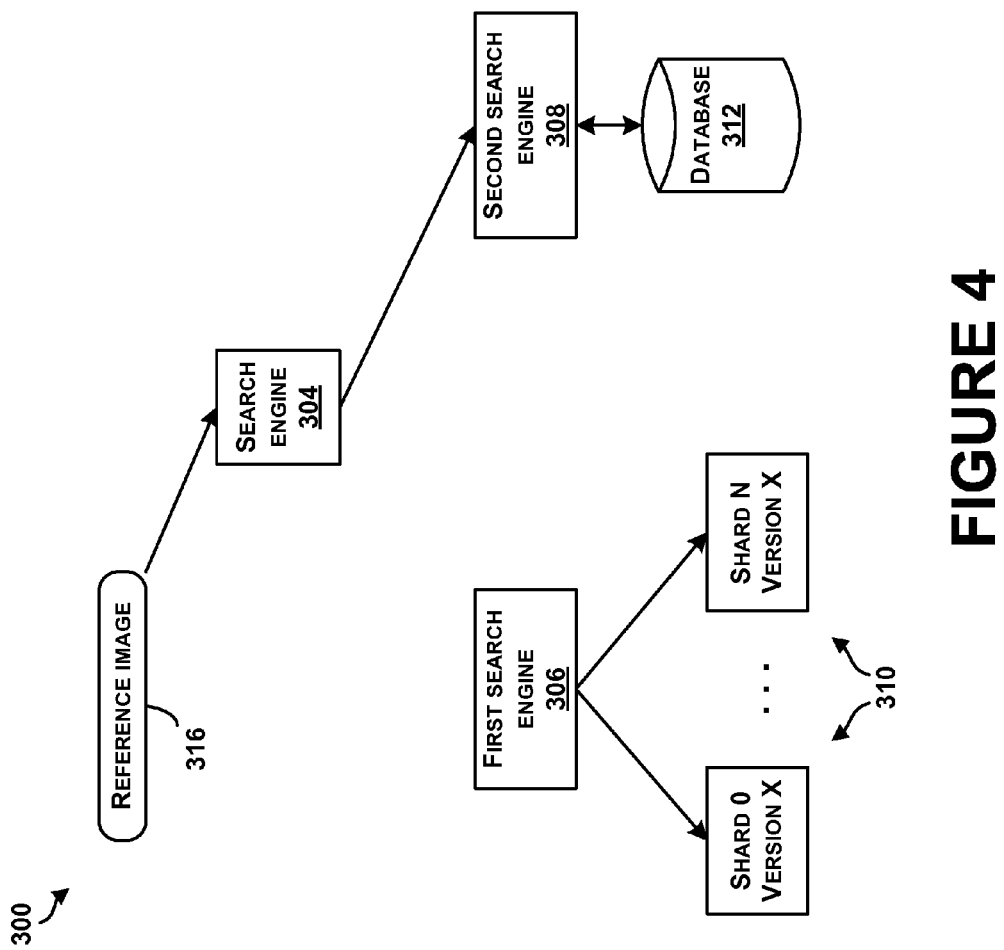
FIG. 4 is another flow diagram illustrating another example configuration of the system.

FIG. 4 is another flow diagram illustrating another example configuration of the system 300. As shown in FIG. 4, a reference image 316 may be received by the search engine 304. The reference image 316 may be a new image to be added to a searchable index of the search engine 304. For example, associated metadata identifying an object in the reference image 316 may be received with the reference image 316. The search engine 304 may add the reference image 316 to the database 312. In one instance, one or more image descriptors associated with the reference image 316 may be determined and stored in the database 312. In some examples, information linking the reference image 316, the determined image descriptors, and optionally associated metadata may be maintained within an identification component of the database 312. The link may be maintained such that if an image descriptor of a subsequently received query image matches one or more of the determined image descriptors, information identifying the reference image 316 and/or any associated metadata may be determined.

In one example, a user may submit a query image to the search engine 304 in order to search for more information about an object within the query image. The user may receive results, and subsequently request that the query image be added to the search engine 304. The query image may be added to the database 312. Furthermore, the results received by the user may include associated metadata, and the metadata may also be associated with the query image in the database 312. In some examples, a separate database from the database 312 may be used to store metadata. In other examples, the database 312 may include multiple databases.

In some instances, the reference image 316 may be received while the query image 302 is received or while the search engine 304 is searching for images matching the query image 302. Additionally, any combination of one or more reference images and one or more query images may be received simultaneously.

Figure 5:
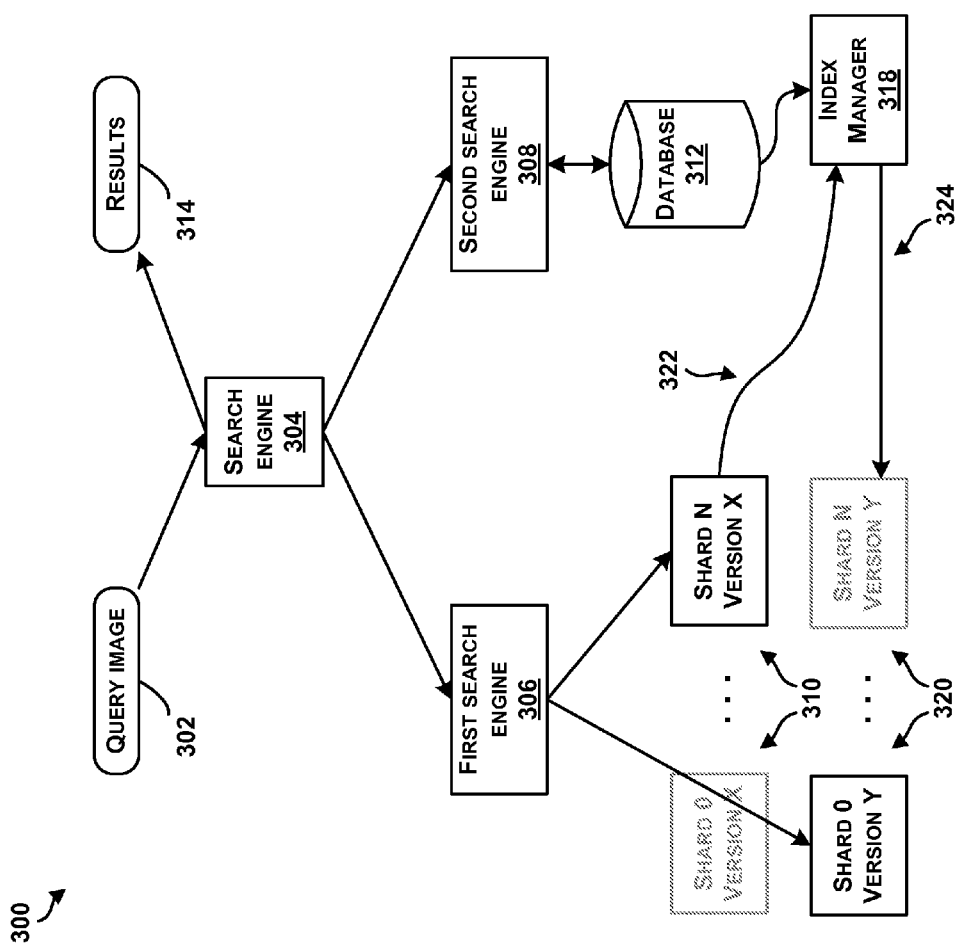
FIG. 5 is still another flow diagram illustrating another example configuration of the system.

FIG. 5 is still another flow diagram illustrating another example configuration of the system 300. In some examples, the system 300 may include an index manager 318. In response to an instruction to merge the images of the database 312 into the database shards 310, the index manager 318 may merge the images currently in the database 312 with images represented in the database shards 310 to create a new version of database shards 320. In one instance, the index manager may monitor a size of the database 312, and once a threshold associated with the database 312, e.g., a number of images, a physical memory size, etc., has been surpassed, the index manager 318 may merge the images in the database 312 into the database shards 310.

In one instance, uncompressed image descriptors of the database 312 may be combined with a set of uncompressed image descriptors associated with the database shards 310. For example, the set of uncompressed image descriptors may be determined by uncompressing the compressed image descriptors of the database shards 310. In another example, the set of uncompressed image descriptors may be retrieved from another database. The resulting combined group of uncompressed image descriptors may be partitioned into multiple shards of similar image descriptors and compressed into another version of database shards 320. As described previously, the combined group of uncompressed image descriptors may be partitioned using the same technique that was used to determine the database shards 310 such that a one-to-one relationship is maintained between, for example, shard 0-version X and shard 0-version Y, shard 1-version X and shard 1-version Y, . . . and shard N-version X and shard N-version Y.

In one example, the index manager 318 may replace the database shards 310 with shards from the database shards 320. For instance, shard 0-version X may be replaced with shard 0-version Y, shard 1-version X may be replaced with shard 1-version Y, . . . and shard N-version X may be replaced with shard N-version Y. In some examples, individual shards from the database shards 310 may be replaced with corresponding individual shards from the database shards 320 one-by-one and one at a time. For example, as conceptually illustrated by line 322, shard N-version X may be recalled from the static index, and replaced with shard N-version Y, as conceptually illustrated by line 324.

In some instances, the replacement of database shards 310 may occur while the search engine 304 is searching for images matching any number of query images and/or receiving any number of reference images.

In some examples, the images of the database 312 may be deleted after the database shards 310 have been replaced by the database shards 320. The database 312 may subsequently receive additional reference images. In some instances, the additional reference images may be merged into the database shards 320 when, for example, the index manager 318 determines a size of the database 312 exceeds a threshold.

Figure 6:
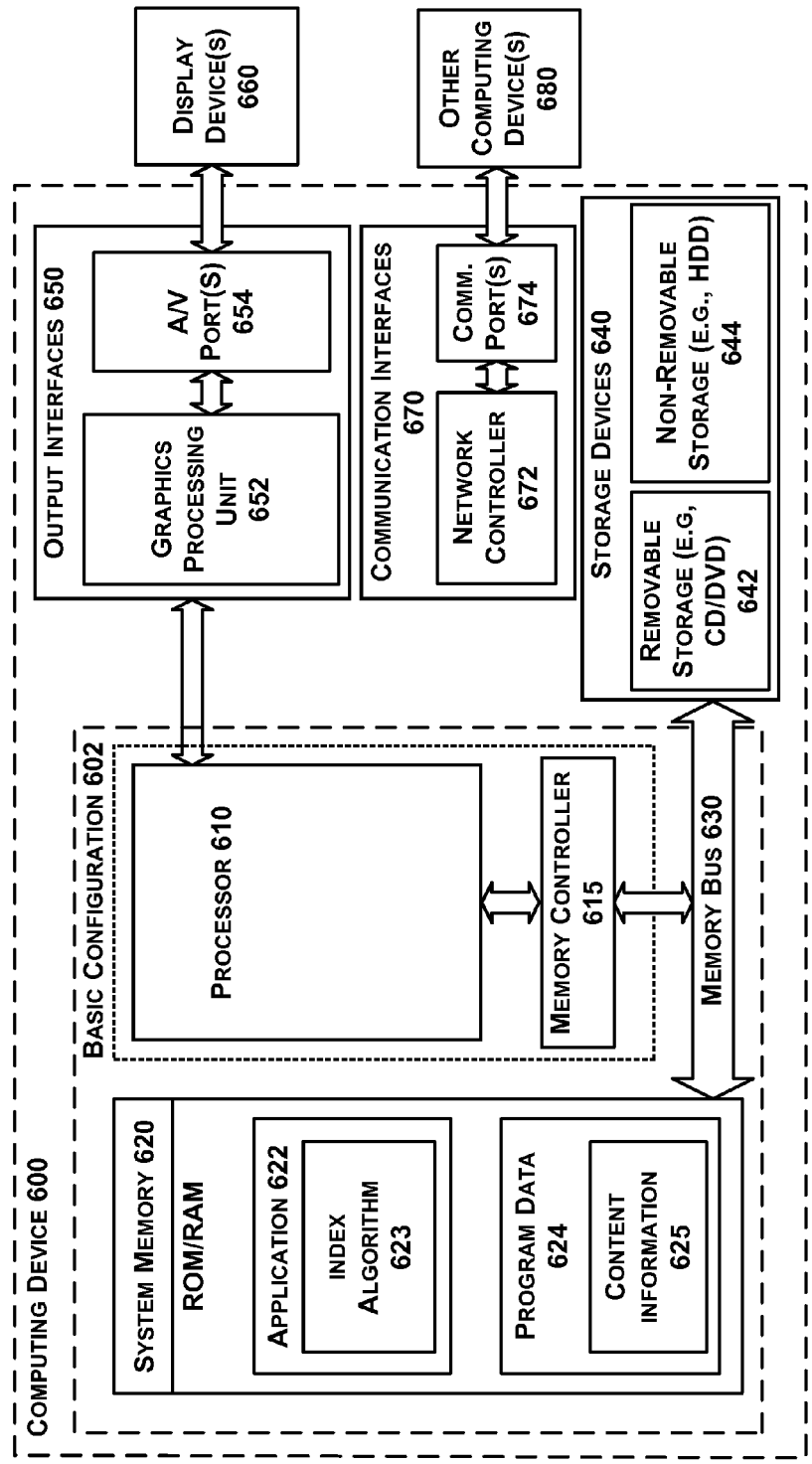
FIG. 6 is a functional block diagram illustrating an example computing device used in a computing system that is arranged in accordance with at least some implementations described herein.

FIG. 6 is a functional block diagram illustrating an example computing device 600 used in a computing system that is arranged in accordance with at least some implementations described herein. The computing device may be a personal computer, mobile device, cellular phone, touch-sensitive wristwatch, tablet computer, video game system, or global positioning system, and may be implemented to provide a dynamic visual search engine as described in FIGS. 1-6. In a basic configuration 602, computing device 600 may typically include one or more processors 610 and system memory 620. A memory bus 630 can be used for communicating between the processor 610 and the system memory 620. Depending on the desired configuration, processor 610 can be of any type including but not limited to a microprocessor (μP), a microcontroller (μC), a digital signal processor (DSP), or any combination thereof. A memory controller 615 can also be used with the processor 610, or in some implementations, the memory controller 615 can be an internal part of the processor 610.

Depending on the desired configuration, the system memory 620 can be of any type including but not limited to volatile memory, such as RAM, non-volatile memory, such as ROM, flash memory, etc., or any combination thereof. System memory 620 may include one or more applications 622, and program data 624. Application 622 may include an index algorithm 623 that is arranged to provide inputs to the electronic circuits, in accordance with the present disclosure. Program data 624 may include content information 625 that could be directed to any number of types of data. In some example implementations, application 622 can be arranged to operate with program data 624 on an operating system.

Computing device 600 can have additional features or functionality, and additional interfaces to facilitate communications between the basic configuration 602 and any devices and interfaces. For example, data storage devices 640 can be provided including removable storage devices 642, non-removable storage devices 644, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer readable instructions, data structures, program modules, or other data.

System memory 620 and storage devices 640 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media can be part of device 600.

Computing device 600 can also include output interfaces 650 that may include a graphics processing unit 652, which can be configured to communicate to various external devices such as display devices 660 or speakers via one or more A/V ports 654 or a communication interface 660. The communication interface 670 may include a network controller 672, which can be arranged to facilitate communications with one or more other computing devices 680 over a network communication via one or more communication ports 674. The communication connection is one example of a communication media. Communication media may be embodied by computer readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

Computing device 600 can be implemented as a portion of a small-form factor portable, or mobile, electronic device such as a cell phone, a personal data assistant (PDA), a personal media player device, a tablet device, a wireless web-watch device, a personal headset device, an application specific device, or a hybrid device that include any of the above functions. Computing device 600 can also be implemented as a personal computer including both laptop computer and non-laptop computer configurations. In another example, the computing device 600 may be implemented as any type of server.

Figure 7:
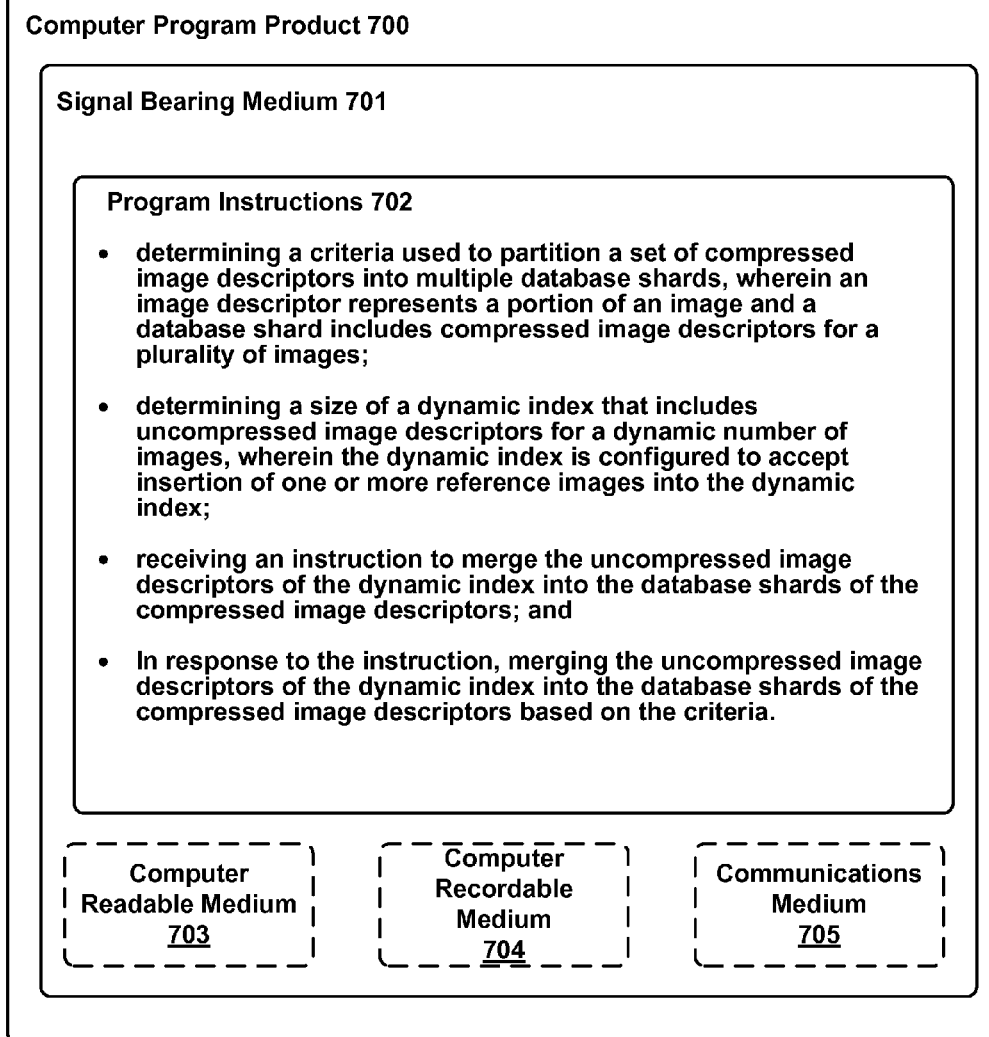
FIG. 7 is a schematic illustrating a conceptual partial view of an example computer program product that includes a computer program for executing a computer process on a computing device, arranged according to at least some implementations presented herein.

In some implementations, the disclosed methods may be implemented as computer program instructions encoded on a non-transitory computer-readable storage media in a machine-readable format, or on other non-transitory media or articles of manufacture. FIG. 7 is a schematic illustrating a conceptual partial view of an example computer program product 700 that includes a computer program for executing a computer process on a computing device, arranged according to at least some implementations presented herein. In one implementation, the example computer program product 700 is provided using a signal bearing medium 701. The signal bearing medium 701 may include one or more programming instructions 702 that, when executed by one or more processors may provide functionality or portions of the functionality described above with respect to FIGS. 1-6. Thus, for example, referring to the implementations shown in FIG. 2, one or more features of blocks 202-208 may be undertaken by one or more instructions associated with the signal bearing medium 701.

In some examples, the signal bearing medium 701 may encompass a computer-readable medium 703, such as, but not limited to, a hard disk drive, a Compact Disc (CD), a Digital Video Disk (DVD), a digital tape, memory, etc. In some implementations, the signal bearing medium 701 may encompass a computer recordable medium 704, such as, but not limited to, memory, read/write (R/W) CDs, R/W DVDs, etc. In some implementations, the signal bearing medium 701 may encompass a communications medium 705, such as, but not limited to, a digital and/or an analog communication medium, e.g., a fiber optic cable, a waveguide, a wired communications link, a wireless communication link, etc. Thus, for example, the signal bearing medium 701 may be conveyed by a wireless form of the communications medium 705, e.g., a wireless communications medium conforming with the IEEE 702.11 standard or other transmission protocol.

The one or more programming instructions 702 may be, for example, computer executable and/or logic implemented instructions. In some examples, a computing device such as the computing device 600 of FIG. 6 may be configured to provide various operations, functions, or actions in response to the programming instructions 702 conveyed to the computing device 600 by one or more of the computer readable medium 703, the computer recordable medium 704, and/or the communications medium 705. Example programming instructions 702 are illustrated in FIG. 7 to include portions of the method shown in FIG. 2; however, the programming instructions 702 may take other forms and may include instructions to perform any of the methods described herein, or portions of any of the methods described herein.

In still further examples, any types of devices or components of devices described herein may be used or configured as means for performing functions of any of the methods described herein, or any portions of the methods described herein.

It should be understood that arrangements described herein are for purposes of example only. As such, those skilled in the art will appreciate that other arrangements and other elements, e.g. machines, interfaces, functions, orders, and groupings of functions, etc., can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. A computer-implemented method comprising:
   determining that one or more image features that are stored in a dynamic index that stores image features in an uncompressed form, are to be migrated to a static index that stores image features in a compressed form, the static index including one or more existing sets of image features, wherein both the dynamic index and the static index are used by an image search system to identify images that match query images;
   in response to determining that the one or more image features stored in the dynamic index are to be migrated to the static index, classifying the determined one or more image features that are stored in the dynamic index in the uncompressed form and that are to be migrated from the dynamic index to the static index into a particular, existing set of image features, according to a classification scheme associated with the static index;
   compressing the determined one or more image features that were classified into the particular, existing set of image features;
   generating a replacement set of image features including (i) the compressed one or more image features that were classified into the particular, existing set of image features, and (ii) one or more compressed image features from the particular, existing set of image features; and
   replacing the particular, existing set of image features included in the static index with the replacement set of image features.

2. The method of claim 1, wherein determining to migrate one or more image features that are stored in a dynamic index to a static index comprises:
   determining that a number of image features stored in the dynamic index satisfies a threshold; and
   in response to determining that the number of image features stored in the dynamic index satisfies the threshold, determining to migrate the one or more image features that are stored in the dynamic index to the static index.

3. The method of claim 1, wherein determining to migrate one or more image features that are stored in a dynamic index to a static index comprises:
   determining that a size associated with image features stored in the dynamic index satisfies a threshold; and
   in response to determining that the size associated with the image features stored in the dynamic index satisfies the threshold, determining to migrate the one or more image features that are stored in the dynamic index to the static index.

4. The method of claim 1, wherein determining to migrate one or more image features that are stored in a dynamic index to a static index comprises:
   extracting the one or more image features from one or more query images; and
   storing the one or more image features in the dynamic index.

5. The method of claim 1, wherein determining to migrate one or more image features that are stored in a dynamic index to a static index comprises:
   receiving a request to add one or more query images to the image search system; and
   in response to receiving the request to add the one or more query images to the image search system, determining to migrate one or more image features associated with the one or more query images from the dynamic index to the static index.

6. The method of claim 1, comprising:
   deleting the one or more image features that were classified into the particular, existing set of images features from the dynamic index.

7. The method of claim 1, wherein each of the one or more image features includes a respective vector of numbers representing information extracted from local pixels around an image interest point of an image.

8. The method of claim 1, wherein classifying the determined one or more image features in the uncompressed form into a particular, existing set of image features comprises:
   uncompressing particular image features from the particular, existing set of image features into particular uncompressed image features; and
   combining the uncompressed particular image features with the one or more image features.

9. A computer-readable medium storing software having stored thereon instructions, which, when executed by one or more computers, cause the one or more computers to perform operations of:
   determining that one or more image features stored in a dynamic index that stores image features in an uncompressed form, are to be migrated to a static index that stores image features in a compressed form, the static index including one or more existing sets of image features, wherein both the dynamic index and the static index are used by an image search system to identify images that match query images;
   in response to determining that the one or more image features stored in the dynamic index are to be migrated to the static index, classifying the determined one or more image features that are stored in the dynamic index in the uncompressed form and that are to be migrated from the dynamic index to the static index into a particular, existing set of image features, according to a classification scheme associated with the static index;
   compressing the determined one or more image features that were classified into the particular, existing set of image features;
   generating a replacement set of image features including (i) the compressed one or more image features that were classified into the particular, existing set of image features, and (ii) one or more compressed image features from the particular, existing set of image features; and
   replacing the particular, existing set of image features included in the static index with the replacement set of image features.

10. The computer-readable medium of claim 9, wherein determining to migrate one or more image features that are stored in a dynamic index to a static index comprises:
- determining that a number of image features stored in the dynamic index satisfies a threshold; and
- in response to determining that the number of image features stored in the dynamic index satisfies the threshold, determining to migrate the one or more image features that are stored in the dynamic index to the static index.

11. The computer-readable medium of claim 9, wherein determining to migrate one or more image features that are stored in a dynamic index to a static index comprises:
- determining that a size associated with image features stored in the dynamic index satisfies a threshold; and
- in response to determining that the size associated with the image features stored in the dynamic index satisfies the threshold, determining to migrate the one or more image features that are stored in the dynamic index to the static index.

12. The computer-readable medium of claim 9, wherein determining to migrate one or more image features that are stored in a dynamic index to a static index comprises:
- receiving a request to add one or more query images to the image search system; and
- in response to receiving the request to add the one or more query images to the image search system, determining to migrate one or more image features associated with the one or more query images from the dynamic index to the static index.

13. The computer-readable medium of claim 9, comprising:
- deleting the one or more image features that were classified into the particular, existing set of images features from the dynamic index.

14. The computer-readable medium of claim 9, wherein classifying the determined one or more image features in the uncompressed form into a particular, existing set of image features comprises:
- uncompressing particular image features from the particular, existing set of image features into particular uncompressed image features; and
- combining the uncompressed particular image features with the one or more image features.

15. A system comprising:
- one or more processors and one or more computer storage media storing instructions that are operable, when executed by the one or more processors, to cause the one or more processors to perform operations comprising:
  - determining that one or more image features stored in a dynamic index that stores image features in an uncompressed form, are to be migrated to a static index that stores image features in a compressed form, the static index including one or more existing sets of image features, wherein both the dynamic index and the static index are used by an image search system to identify images that match query images;
  - in response to determining that the one or more image features stored in the dynamic index are to be migrated to the static index, classifying the determined one or more image features that are stored in the dynamic index in the uncompressed form and that are to be migrated from the dynamic index to the static index into a particular, existing set of image features, according to a classification scheme associated with the static index;
  - compressing the determined one or more image features that were classified into the particular, existing set of image features;
  - generating a replacement set of image features including (i) the compressed one or more image features that were classified into the particular, existing set of image features, and (ii) one or more compressed image features from the particular, existing set of image features; and
  - replacing the particular, existing set of image features included in the static index with the replacement set of image features.

16. The system of claim 15, wherein determining to migrate one or more image features that are stored in a dynamic index to a static index comprises:
- determining that a number of image features stored in the dynamic index satisfies a threshold; and
- in response to determining that the number of image features stored in the dynamic index satisfies the threshold, determining to migrate the one or more image features that are stored in the dynamic index to the static index.

17. The system of claim 15, wherein determining to migrate one or more image features that are stored in a dynamic index to a static index comprises:
- determining that a size associated with image features stored in the dynamic index satisfies a threshold; and
- in response to determining that the size associated with the image features stored in the dynamic index satisfies the threshold, determining to migrate the one or more image features that are stored in the dynamic index to the static index.

18. The system of claim 15, wherein determining to migrate one or more image features that are stored in a dynamic index to a static index comprises:
- receiving a request to add one or more query images to the image search system; and
- in response to receiving the request to add the one or more query images to the image search system, determining to migrate one or more image features associated with the one or more query images from the dynamic index to the static index.

19. The system of claim 15, comprising:
- deleting the one or more image features that were classified into the particular, existing set of images features from the dynamic index.

20. The system of claim 15, wherein classifying the determined one or more image features in the uncompressed form into a particular, existing set of image features comprises:
- uncompressing particular image features from the particular, existing set of image features into particular uncompressed image features; and
- combining the uncompressed particular image features with the one or more image features.

21. The system of claim 15, wherein each of the one or more image features includes a respective vector of numbers representing information extracted from local pixels around an image interest point of an image.

* * * * *